United States Patent [19]

Falco et al.

[11] Patent Number: 5,267,487
[45] Date of Patent: Dec. 7, 1993

[54] VIBRATION HANDLE GRIP AND PROCESS FOR MAKING SAME

[75] Inventors: Robert N. Falco, Indianapolis, Ind.; Colin Williams, Signal Mountain, Tenn.

[73] Assignee: Cabot Safety Corporation, Southbridge, Mass.

[21] Appl. No.: 911,263

[22] Filed: Jul. 7, 1992

Related U.S. Application Data

[63] Continuation-in-part of Ser. No. 555,136, Jul. 19, 1990, abandoned.

[51] Int. Cl.⁵ .......................... B62D 1/06; G05G 1/10
[52] U.S. Cl. ........................... 74/558; 74/557; 428/36.1; 428/36.8; 428/36.9
[58] Field of Search ........................ 74/558, 558.5, 552, 74/557; 156/86, 289; 428/36.1, 34.1, 36.8, 36.9

[56] References Cited

U.S. PATENT DOCUMENTS

| | | | |
|---|---|---|---|
| 2,121,963 | 6/1938 | Goit | 74/558 |
| 2,226,866 | 12/1940 | Lipschultz | 74/558 |
| 2,227,579 | 1/1941 | Harley | 74/558 |
| 2,270,902 | 1/1942 | Rubissow | 74/558 |
| 3,802,291 | 4/1974 | Young et al. | 74/558 |
| 4,149,921 | 4/1979 | Stannard | 428/36.1 X |
| 4,168,754 | 9/1979 | Nyholm | 175/325 |
| 4,381,579 | 5/1983 | Rumpp | 16/111 R |
| 4,390,585 | 6/1983 | Holden | 428/172 |
| 4,415,954 | 11/1983 | Schaefer | 362/202 |
| 4,416,166 | 11/1983 | Jannard et al. | 74/551.9 |
| 4,425,334 | 6/1984 | Ogino et al. | 428/36.1 |
| 4,441,382 | 4/1984 | Snooks | 74/558 |
| 4,476,742 | 10/1984 | Midgley | 74/551.9 |
| 4,552,944 | 11/1985 | Kamiyama et al. | 528/55 |
| 4,567,093 | 1/1986 | Sogabe et al. | 428/250 |
| 4,685,987 | 8/1987 | Fick | 428/36.1 X |
| 4,729,860 | 3/1988 | Leach | 428/36 X |
| 4,739,674 | 4/1988 | Hori | 74/551.9 |
| 4,758,470 | 7/1988 | Koyama | 74/558 X |
| 4,761,333 | 8/1988 | Takimoto et al. | 74/558 X |
| 4,788,759 | 12/1988 | Yano et al. | 74/558 X |
| 4,828,909 | 5/1989 | Davis et al. | 428/253 |
| 4,929,497 | 5/1990 | Mitchell et al. | 428/265 |
| 5,028,464 | 7/1991 | Shigetoh | 428/35.9 |
| 5,087,512 | 2/1992 | Uihlein et al. | 428/266 |

FOREIGN PATENT DOCUMENTS 0188564  8/1988  Japan ..................... 74/558

Primary Examiner—Vinh T. Luong
Attorney, Agent, or Firm—Michelle B. Lando

[57] ABSTRACT

An improved vibration damping handle grip having a vibration damping elastomer and a webbed, tack-free elastomer-coated tubular shaped material. The vibration damping handle grip is fabricated having a vibration damping elastomer nearest a vibration generating handle, and a webbed tack-free elastomer-coated tubular shaped material adapted to conform to the vibration damping elastomer-covered handle shape, thus providing a comfortable, substantially slip free hand gripping surface.

13 Claims, 4 Drawing Sheets

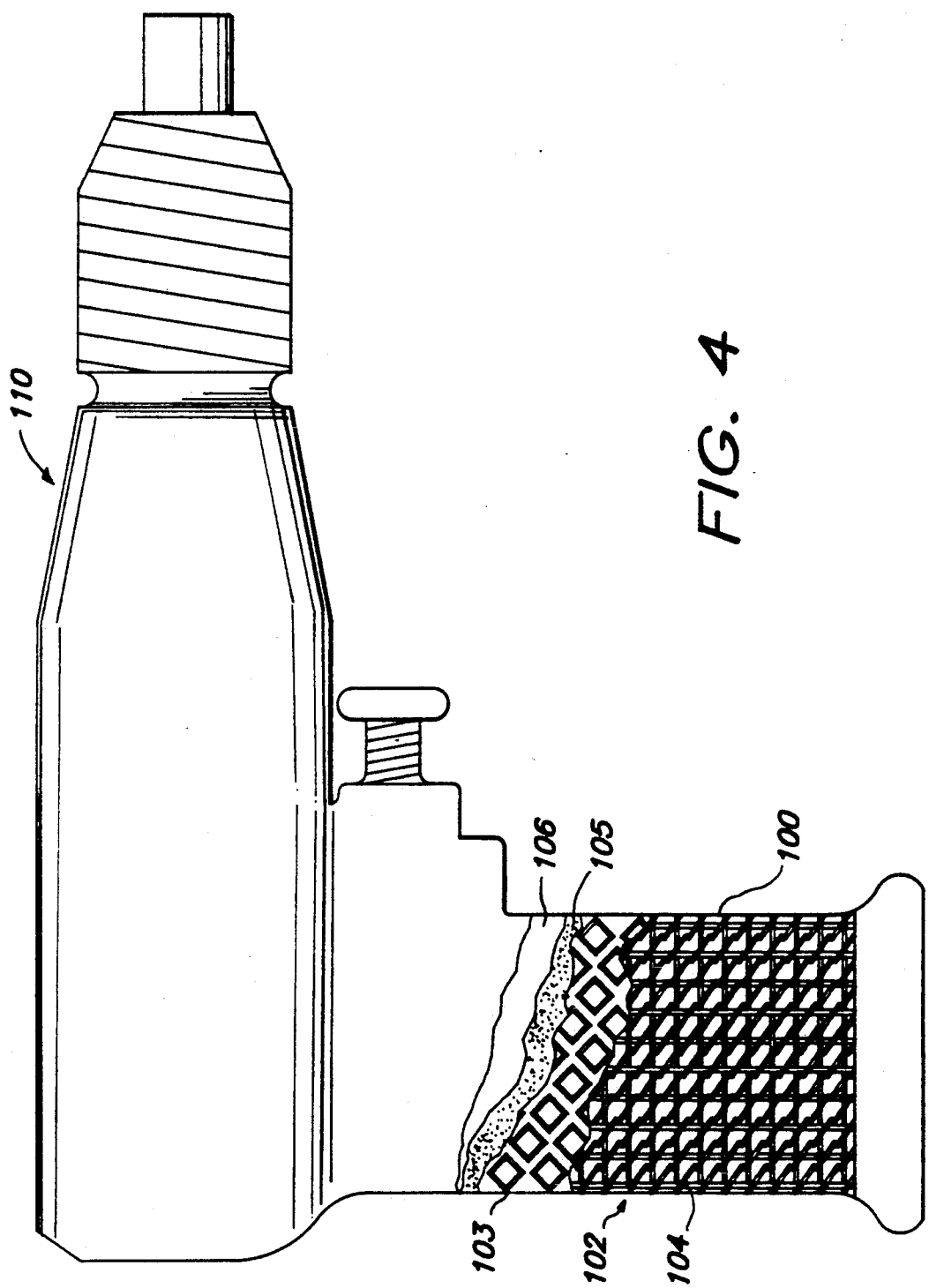

VIBRATION HANDLE GRIP AND PROCESS FOR MAKING SAME

This is a continuation-in-part of copending application Ser. No. 07/555,136 filed on Jul. 19, 1990, now abandoned.

BACKGROUND OF THE INVENTION

1. Field of the Invention

This invention pertains to vibration damping handle grips and the process for making them.

2. Description of the Prior Art

The use of vibration damping handles is well known in various applications including, but not limited to, power tools, hand tools, handle bars, and athletic equipment. These applications generally involve the use of a plastic or rubber-like object placed over the handle during the manufacture of the original equipment or as a replacement grip.

Attempts have been made to isolate the vibrations from these sources by providing vibration damping handles and grips involving the use of a tape, a removable sleeve, or an elastomer cured directly to the product's handle. For example, a hand grip has been described, in U.S. Pat. No. 4,476,742, as a grooved and ridged tape helically wound onto a handle of sporting equipment, hand tools and other articles generally gripped by hand during use. The tape may be effective in providing a measure of traction and some cushioning effect against the hand of the user; nevertheless, the reference fails to disclose vibration damping properties which address the potential health and safety problems associated with excess vibration imparted to the operator's arms and hands over long periods of use. In addition to this apparent deficiency, tapes of this type are suspect in demanding applications such as in power tools used in the construction industry where handles are subjected to heavy use and rough treatment.

Another suggestion describes vibration damping in the form of shrink-wrap tubing systems (U.S. Pat. No. 4,168,754). This method includes placing a vibration damping material over the intended working part of an impact tool; placing a heat shrinkable sleeve over the vibration damping material, and fixing it in place by directly applying a heat source to the tool. At the elevated temperatures the heat shrinkable sleeve decreases in diameter providing a means for the enclosed liquid-like vibration damping material to be mounted to the tool.

This suggestion provides a means for damping vibration and associated sound from the tool. Many disadvantages of this type of system however, including difficult application of the liquid-like vibration damping material and the heat shrinkable sleeve, lack of durability during heavy use over long periods, and a high cost per unit relative to other methods, make use of this apparatus and process impractical for many applications.

Other suggestions include some form of sleeve, removable or permanent, as a grip shield, handle grip, or vibration insulator.

In U.S. Pat. No. 4,415,954 there is described a sleeve of slip resistant material which is forced over the end of a lubricated handle. This method provides improved gripping and protection from the abrasive action of a knurled handle of essentially static items, thereby not requiring, or providing, any vibration damping function.

Handle grips have also been described in the art (for example, U.S. Pat. Nos. 4,381,579; 4,416,166; and 4,739,674) which provide more comfort and traction for the user, and a means to prevent injuries. Because such handles may be subjected to heavy use however, there is a need to provide a grip constructed of a harder material that is more durable. The use of harder, more durable materials for handle grips compromises the vibration damping ability of the handle. Generally, the inventions which attempt to address durability and vibration damping are difficult to apply, and expensive.

SUMMARY OF THE INVENTION

The vibration damping handle grip of the present invention incorporates a vibration damping elastomer with a unique webbed, tack-free elastomer coated material, to overcome the weaknesses of the prior art, as discussed above.

The vibration damping handle grip comprises a vibration damping elastomer, which encompasses or surrounds the substrate vibration generating handle. The vibration damping elastomer is held in place by a webbed, tack-free elastomer coated material which overlaps at least a portion of the elastomer-covered handle.

The process for applying the vibration damping handle grip includes applying a vibration damping elastomer to the substrate vibration generating handle. Next, the webbed, tack-free elastomer-coated tubular shaped material is expanded, and placed over the elastomer-covered handle. The webbed, tack-free elastomer coated tubular shaped material is then relaxed, allowing it to contour to the form of the elastomer-covered handle for a secure fit. In addition to holding the vibration damping elastomer in place, the tubular shaped material also imparts improved traction and durability to the handle, while reducing the tackiness effect of the elastomer to maximize user comfort.

BRIEF DESCRIPTION OF THE DRAWINGS

In the accompanying drawings.

FIG. 4 is a side view, partially cut away, of the vibration generating handle as applied to a hand tool.

DETAILED DESCRIPTION OF THE INVENTION

Figure 1:
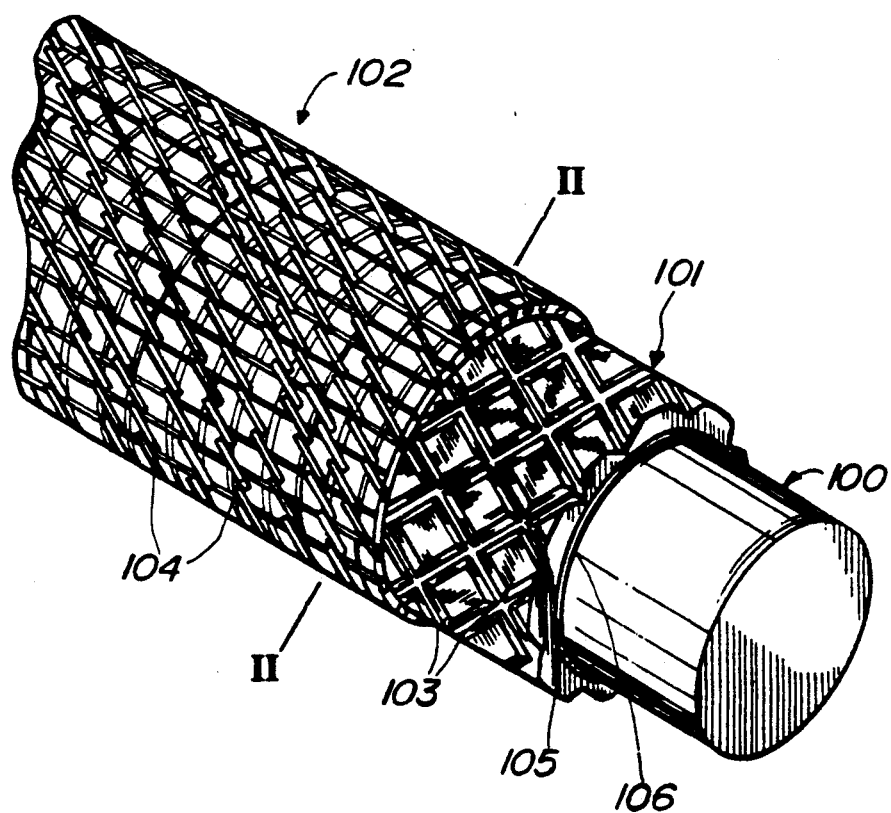
FIG. 1 is a cut-away perspective side view of a vibration generating handle according to the present invention.
Figure 2:
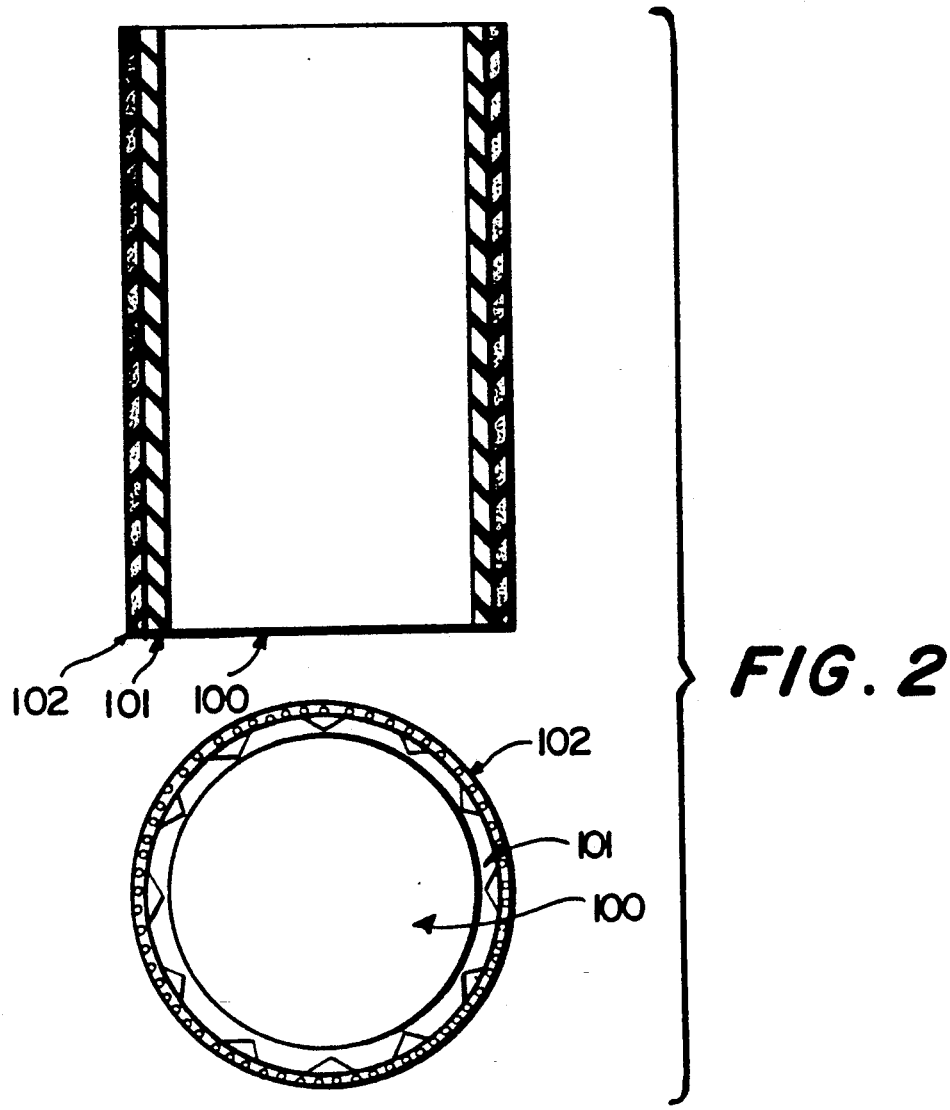
FIG. 2 is a cross-sectional side view, and a top view of the vibration generating handle and grip of the present invention taken along line II—II of FIG. 1.

The present invention provides a vibration damping handle grip, shown in FIGS. 1 and 2, with vibration damping and improved gripping characteristics.

The vibration generating handle 100, which is generally gripped by hand during use, is completely or partially encompassed with a vibration damping elastomer 101. The vibration generating handle 100 may be attached to or part of any type of handle generally gripped by the hand including, for example, power tool 110, hand tools and athletic equipment handles such as baseball bats, tennis rackets and the like. The elastomer may be preformed and affixed with an adhesive, or rolled out onto the vibration generating handle. The elastomer may also be applied as a liquid, by spraying or dipping the substrate handle with the elastomer, then curing it in place.

The preferred method of applying the elastomer is to wrap pre-cut sheets (molded by conventional means of various sizes, depending on the application) around the substrate vibration generating handle. The elastomer is preferably wrapped completely around the handle until the opposite ends are flush with each other. The elastomer may be held in place with the use of any chemically compatible commercially available adhesive, a tape such as ABSORB-MOR ® disposable grip tape for handles (a registered trademark of Winn, Inc.), or other means such as shrink wrap tubing. If a commercial available adhesive is used, the elastomer 101 will typically be laminated on one side with a pressure sensitive adhesive transfer tape. Typically, the adhesive 105 will be protected by a release liner 106 which is removed after the elastomer 101 is cut to fit the vibration generating handle 100 and before placement of elastomer 101 onto handle 100. The elastomer 101 is wrapped with the adhesive 105 facing the handle to hold its place temporarily. It is to be understood however that other methods of applying an elastomer (liquid or solid) to a vibration generating handle may be acceptable.

The vibration damping elastomer may be any solid or cellular polymer material with vibration damping characteristics such as softness and resiliency. The preferred vibration damping elastomer is a thermally stable, super-soft polyurethane with a Shore 00 hardness of between about 30 to about 85, a 100% tensile modulus of between about 0.5 kg/cm$^2$ to about 10kg/cm$^2$, and a density of between about 0.80 g/cm$^3$ to about 1.40 g/cm$^3$. A representative material is disclosed in U.S. Pat. No. 4,552,944, the disclosure of which is incorporated by reference. The elastomer may be applied as described in more than one layer; however it is preferred to use one layer, which totally covers the vibration generating handle. In either case, the elastomer layer on the handle should be thick enough to isolate and attenuate vibration. The thickness is typically between about 2 millimeters (0.08 inch) to about 10 millimeters (0.40 inch). A preferred thickness of the elastomer layer on the handle is between about 3 millimeters (0.125 inch) to about 6 millimeters (0.25 inch), the most preferred being about 4.8 millimeters (0.19 inch). This feature however, is also dependent upon the particular application's needs.

The vibration damping elastomer, to enhance softness and associated vibration isolation capabilities, may have a deep etched pattern or grooves 103 on at least one side. The depth of the grooves depends on the thickness of the elastomer, and is between about 0.8 millimeter (0.03 inch) to about 4 millimeters (0.16 inch); a preferred depth is between about 1.2 millimeters (0.05 inch) to about 2.4 millimeters (0.10 inch), the most preferred being about 1.9 millimeters (0.075 inch). Such a design would reduce the contact area between the elastomer and the hand; additionally, the bulge factor, the area free to bulge divided by the contact area, would increase. Other approaches in this regard may include putting regularly shaped and spaced holes through, or protrusions onto at least one side of the elastomer's planar surface.

FIG. 1 illustrates a webbed, tack-free elastomer coated, tubular shaped material 102 on top of the vibration damping elastomer 101 which is covering the handle 100 (also shown in FIG. 2).

The webbed, tack-free elastomer coated, tubular shaped material 102 is produced by expanding a tubular, knitted, braided, or woven fabric and placing it onto a tube constructed of a non-stick, inert plastic material, preferably TEFLON ® material (a registered trademark of E.I. DuPont de Nemours & Co. Inc.). The tube should be of similar form as the vibration generating handle. Once on the tube, the tubular fabric can be impregnated with a tack-free elastomer by spraying or brushing; dipping is the preferred method of impregnating the tubular fabric to ensure maximum contact. The fabric, on the tube, is then dried in an oven at between about 50° C. (120° F.) to about 115° C. (240° F.), preferably 82° C. (180° F.) for about 30 minutes, or until dry. The fabric is then stripped off of the tube and trimmed for use.

The tubular substrate fabric may be an elastic or non-elastic fiber. The fibers may include cotton, polyester, nylon, polypropylene, polyurethane, and blends thereof including other elastic fibers, which are arranged by knitting, braiding, or weaving. The fabric may be webbed including a mesh or netting woven of strands that are interlaced and knotted at intervals 104, as shown in the Figures (such as the "Elastic Dressing Retainer" produced by Zens Health Care Company, Milwaukee, Wisconsin). The mesh size, as determined by the width of the knotted intervals, may be varied depending upon the user's needs; in the present invention, the openings allow for contact with the elastomer covered handle. Typically, the openings are triangular and between about 3 millimeters (0.125 inch) to about 9 millimeters (0.375 inch) per side; the preferred opening is about 6 millimeters (0.25 inch) per side. As an alternative embodyment, the fabric may be moulded connecting fiber strands.

The preferred impregnating tack-free elastomer coating on the tubular fabric is polychloroprene due to its stability and non-tackiness. However, other materials can be used such as natural rubber, styrene butadiene rubber, nitrile rubber, or silicone rubber preferably in latex, or polymer solutions.

Once fabricated, the webbed, coated fabric, hereafter tubular shaped material 102 is expanded from its original diameter (approximately the same diameter as the tube used during curing) and placed or rolled over the vibration damping elastomer-covered handle to an extent sufficient to provide a grip surface to the handle. The material 102 may be employed with an original inside diameter of between about 30% to about 70% of the outside diameter of the elastomer-covered handle. In the preferred embodiment the inside diameter of the tubular shaped material 102 is about 50% of the outside diameter of the elastomer-covered handle. The tubular shaped material 102 is then relaxed and conforms to the shape of the elastomer-covered handle. Although the tubular shaped material performs best with an open weave, either a closer weave or more elastomer coating can be applied resulting in elastomer filled in between the weave, resembling fiber reinforced tubing.

The tubular shaped material 102, in addition to fixing the vibration damping elastomer 101 on the handle 100, imparts several advantages to the composite handle. It is easy to apply, or replace, on a wide variety of handles; in addition to the traditional methods, application may also be undertaken with the help of a conventional lubricant which could easily be washed away through the weave. The weblike design provides the user with improved gripping, or traction, on the handle. Another advantage gained by the application of the tubular shaped material is that cuts or tears anywhere in the handle grip will not propagate due to its network-like fabrication. Various size mesh patterns can be utilized, depending on the application and the operator's needs; a broad weave is preferred for vibration damping, while a narrow weave is better for improved gripping. Still another benefit of the tubular shaped material is that the tack-free elastomer coating greatly reduces the clean-up and safety problems associated with gummy-surfaced coatings.

Overall, the vibration damping handle grip of the present invention provides many advantages for the user. The system is adaptable to a wide variety of handle applications, including power and hand tools, or any other articles generally gripped by the hand. Relatedly, the present handle grip does not require additional adhesives, or special fittings to be attached; application is relatively simple and can be performed by the user in the field or the original equipment manufacturer. Collectively, the handle grip is relatively inexpensive due to the routine materials of construction, and the lack of any additional fasteners or adhesives. In addition, the handle is durable under continuous rough use. In total, the present invention addresses the need for an inexpensive, easy-to-apply, comfortable, vibration damping handle grip with improved traction for the user.

The following example is illustrative of the invention which is concerned with a process of applying the vibration damping handle grip, as described above. It will be understood that the invention is not limited thereto.

EXAMPLE

Figure 3:
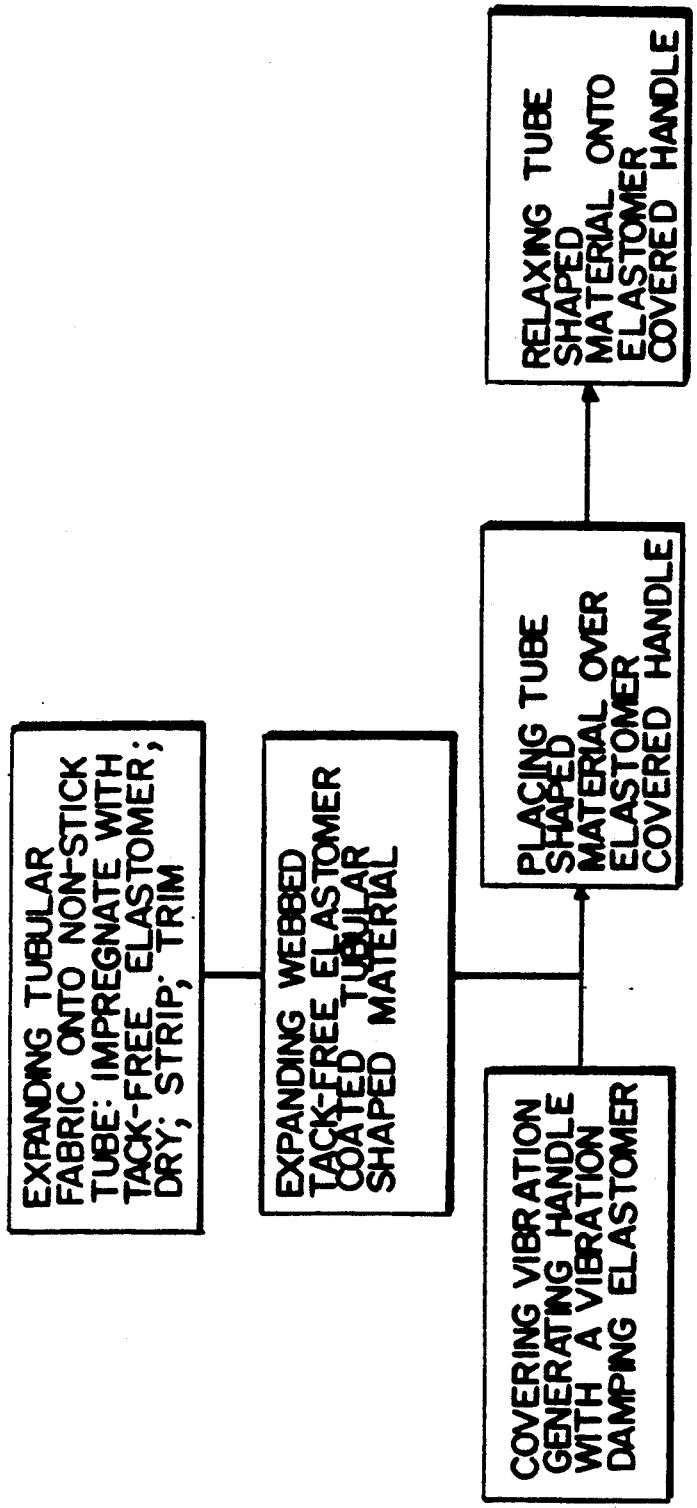
FIG. 3 depicts, in block diagram form, a process of applying the vibration damping handle grip to a vibration generating handle.

The block diagram in FIG. 3 depicts the process steps herein described.

A vibration generating handle of a power tool (Ingersoll Rand Air Hammer Model 117) was first wrapped with a vibration damping VISCOLAS ® elastomer (a registered trademark of Cabot Corporation). Sheets of the VISCOLAS ® material were cut-to-fit the diameter of the handle. A single layer of the elastomer was wrapped around the handle until the ends were flush. The VISCOLAS ® material used is approximately 4.8 millimeters (0.19 inch) thick, and has a 6.4 millimeters × 7.6 millimeters × 1.9 millimeters (0.25 inch × 0.30 inch × 0.075 inch) deep etched diamond pattern on the hand grip side. The diamond pattern is provided to improve the vibration isolation of the hand by reducing the contact area per given force and increasing the bulge factor. On the opposite side, the VISCOLAS ® material is laminated with FASTAPE ® 1125 pressure sensitive adhesive transfer tape (a registered trademark of Avery International Corporation), which is a 5.0 mil (0.13 millimeter) film of acrylic adhesive. The adhesive is protected by a polyethylene coated, natural kraft release liner which was removed after the VISCOLAS ® material was cut, prior to wrapping the tool handle with the adhesive facing the handle to hold it in place temporarily.

An elastic, webbed, tack-free elastomer coated tubular shaped material was applied to hold the vibration damping elastomer in place for longer periods, and to impart improved traction for the user's hand.

The tubular shaped material is produced by sliding an elastic dressing retainer (#2 Zens Health Care latex/poly blend mesh tube) over a form. The elastic dressing retainer is a woven polyester fabric which is interlaced and knotted at intervals of approximately 6 millimeters (0.25 inch) forming a triangular mesh. The form is made of TEFLON ® material coated aluminum or a suitable non-stick surface. The form should be no larger than twice the diameter of the Zens tube, so as not to stretch the fabric beyond its elastic yield point. After the tube is on the form, it is dipped into an aqueous neoprene latex solution. The form is removed from the dip tank, and excess solution is allowed to drain off the tube. The form is then placed into an oven set at about 82° C. (180° F.) for about 30 minutes. After drying, the tube is peeled off the form and trimmed to the desired length.

The tube was expanded, and placed over the vibration damping material covered handle. The tube was then relaxed to take the form of the handle.

An accelerometer and mounting frame were placed between the hand and the tool handle. The tool was then operated, and the signal was sent to a frequency analyzer and recorded. The same test was undertaken with the vibration damping handle grip in place, except the accelerometer and frame were placed between the hand and the handle grip. The results show the vibration damping handle grip isolates the hand from tool handle vibration, and most effectively reduces the average and peak vibration energy on tools that emit higher levels of high frequency energy.

What is claimed is:

1. A vibration damping handle grip comprising a vibration damping elastomer having etched grooves on at least one side, said vibration damping elastomer being a solid or cellular polymer material having softness and resiliency, and a webbed, tubular shaped material, impregnated with a tack-free elastomer coating, said impregnated tubular shaped material overlapping at least a portion of said vibration damping elastomer, wherein said vibration damping elastomer is a thermally stable polyurethane with a Shore 00 hardness of between about 30 to about 85, a 100% tensile modulus of about 0.5 kg/cm$^2$ to about 10 kg/cm$^2$, and a density of between about 0.80 g/cm$^3$ to about 1.40 g/cm$^3$.

2. The vibration damping handle grip as defined in claim 1 wherein said vibration damping handle grip is applied to a vibration generating handle which is part of a manual tool, a power tool, or a piece of athletic equipment.

3. The vibration damping handle grip as defined in claim 1 wherein said vibration damping elastomer has a thickness of between about 2 millimeters to about 10 millimeters.

4. The vibration damping handle grip as defined in claim 1 wherein said grooves have a depth of between about 0.8 millimeters to about 4 millimeters.

5. The vibration damping handle grip as defined in claim 1 wherein said vibration damping elastomer is laminated with a pressure sensitive adhesive transfer tape on the side facing said vibration generating handle.

6. The vibration damping handle grip as defined in claim 5 wherein said pressure sensitive adhesive transfer tape has a film of acrylic adhesive between about 0.15 millimeter to about 0.01 millimeter thick.

7. The vibration damping handle grip as defined in claim 1 wherein said tubular shaped material is an elastic tubular fabric.

8. The vibration damping handle grip as defined in claim 7 wherein said fabric of said tubular shaped material is a knitted, braided, or woven material selected from the group consisting of cotton, nylon, polyester, polypropylene, polyurethane, and blends thereof.

9. The vibration damping handle grip as defined in claim 1 wherein said tubular shaped material is mesh woven of strands that are interlaced and knotted at intervals of between about 3 millimeters to about 9 millimeters.

10. The vibration damping handle grip as defined in claim 1 wherein said tack-free elastomer coating is produced from a latex, or polymer solution.

11. The vibration damping handle grip as defined in claim 1 wherein said tack-free elastomer coating is natural rubber, styrene butadiene rubber, nitrile rubber, or silicone rubber.

12. The vibration damping handle grip as defined in claim 1 wherein said tack-free elastomer coating is polychloroprene.

13. The vibration damping handle grip as defined in claim 1 wherein said vibration handle grip is applied to a vibration generating handle which is attached to a manual tool, a power tool, or a piece of athletic equipment.

* * * * *